UNITED STATES PATENT OFFICE.

JOHN H. FILBERT, OF BALTIMORE, MARYLAND.

MODIFIED COTTON-SEED OIL.

No. 930,280. Specification of Letters Patent. Patented Aug. 3, 1909.

Original application filed July 3, 1908, Serial No. 441,860. Divided and this application filed March 24, 1909. Serial No. 485,435.

*To all whom it may concern:*

Be it known that I, JOHN H. FILBERT, a citizen of the United States, residing at Baltimore, in the State of Maryland, have invented certain new and useful Improvements in Modified Cotton-Seed Oil, of which the following is a specification.

This invention relates to cotton-seed oil so improved that when heat is applied to the oil the odor ordinarily developed will be modified and this application is a division of original application Serial Number 441,860 filed July 3rd, 1908.

Cotton-seed oil is used largely as an ingredient in various food compounds, such as substitutes for lard. When cotton-seed oil, or any food compound in which such oil is an ingredient, is heated in a pan in the manner that ordinary lard is commonly heated when frying articles of food, an odor is usually developed which many persons deem objectionable; this odor is characteristic of the cotton-seed oil. On the other hand it is well known that animal fats, such as hogs lard and beef fat, do not develop objectionable odors when heat is applied at the time of cooking.

In rendering hog fat to produce refined lard, heat is employed; the first effect of the heat is to reduce the mass of fat to a liquid or oily condition which facilitates the separation from the oil of the fine particles of fibrin and tissue; these particles are soon cooked brown by the hot oil and rise to the surface and are removed by a skimmer. When a sufficient quantity of this browned animal matter has been thus collected, it is usually put in a press and the oil or lard expressed from it, and the dry caked mass left in the press as residuum constitutes the article known as "crackling" which has a pleasant odor and flavor.

I have found that the pleasant odor and flavor characteristic of fresh animal crackling, may be imparted to cotton-seed oil in sufficient degree to have the effect of overcoming or modifying the objectionable odor that usually develops when that oil or any food compound in which such oil is an ingredient, is heated, as in the processes of cooking.

The inventive idea involved in my present invention is to improve cotton-seed oil by the addition thereto of the odor or flavor of animal crackling or animal tissue.

An object of this invention, therefore, is to provide a cotton-seed oil that has been improved by incorporating therewith the essence of animal crackling, or animal tissue, whereby when the improved oil has been heated the odor that will develop will be free of the objection referred to.

Cotton-seed oil, and the essence of animal crackling or other form of animal tissue, may be combined by several different methods. It is, therefore, to be understood that the present invention which relates to the article itself, is not restricted to any particular method for its production.

For the purpose of fully disclosing the invention and the manner and process of making and compounding the same, it will be sufficient to describe two of several methods that are known to me.

Where animal crackling is used I deem it the better course, but not essential, to prepare the caked mass of "crackling" that comes from the press, by breaking it up and grinding it in a suitable mill. When ground the said crackling will have a somewhat similar appearance to finely ground roasted coffee.

Any quantity of the cotton-seed oil may be treated at a time, and will depend on the size of the apparatus or the facilities at hand. It will be assumed, for the purpose of this description, that five thousand (5000) pounds of cotton-seed oil is the quantity to be treated; one process or method is as follows:—The cotton-seed oil is put in a suitable vessel, preferably one to which heat may be applied; the exact degree of temperature to be used is not essential, but the oil must not be heated high enough to burn; it may be heated to a temperature of about 350 degrees F. Of course where heat is used a thermometer should be employed for purposes of accuracy. Fresh, sweet animal crackling is added by sprinkling or otherwise immersing it into the cotton-seed oil,— a suitable proportion of the crackling I have found to be about five per cent. by weight, that is to say, where 5000 pounds of cotton-seed oil is being treated about two hundred and fifty (250) pounds of animal crackling may be used. Of course the proportions of oil and crackling may be varied somewhat according to the judgment of the operator. While the animal crackling is being added the oil may be agitated or stirred to thoroughly distribute the crackling throughout the mass of oil, but this is a matter for judgment on the part of the operator. If heat is employed it may be applied to the oil before the crackling is added, or the crackling may be added to the oil first and the heat applied afterward. When the oil has become heated to the temperature desired, say about 350 degrees F. the heat should be cut off. After the cotton-seed oil and animal crackling have been together a short period, say five or ten minutes where the highest degree of heat here named has been employed, the blending may be considered as complete, and the final step in the method is the separation of the animal crackling from the oil. This separation may be effected by filtration or may be effected by merely allowing the oil to stand until the particles of crackling precipitate, and then drawing off the clear oil. The improved article is then finished.

While the process or method just described employs heat, it is to be understood that heat is not essential and may be dispensed with. If heat is not employed to promote the process then the period of time for keeping the cotton-seed oil and animal crackling together to effect the blend should be extended, and that period may be varied according to the condition or degree of limpidity of the oil.

What has been here stated with reference to animal "crackling" as affecting and improving the cotton-seed oil, is true of both hog and beef crackling. The process when using beef crackling would be the same as when using hog crackling, and the result of improving the oil would be substantially the same—the difference in the result would be merely that the beef crackling would give to the oil when heated an odor characteristic of the beef animal tissue when cooked brown.

Another method for producing the desired article of improved cotton-seed oil consists in first making an oily extract or essence of animal crackling or animal tissue, and subsequently adding the extract or essence to the cotton-seed oil. This extract or essence may be produced in various ways that will be suggested to persons skilled in such art after my inventive idea has been disclosed to them. One way is to grind the fresh animal crackling or tissue, and then place the ground article together with cotton-seed oil in a suitable vessel which may be heated by steam or otherwise; the proportions of animal crackling or tissue and cotton-seed oil may be equal quantities by weight of each. The heat to be applied in making the extract or essence may range from about 212 degrees F. to about 350 degrees F. The period of time for continuing the heat may range from fifteen to thirty minutes. The entire mass enveloped in a suitable cloth or fabric and inclosed in a press should then be subjected to pressure to separate the animal matter from the oil, which latter when filtered constitutes an oil extract or oil essence of animal crackling or tissue. This essence of animal crackling or tissue may be stored in vessels and kept ready for use. This essence may be combined with the cotton-seed oil in the proportion of one part by weight of the said essence with about nine parts of the cotton-seed oil; these will mix or blend and constitutes the improved article of the present invention.

Instead of using animal tissue in the particular form known as "crackling", which is a by-product resulting from the process of rendering fat, I may readily substitute therefor hog, beef or other animal meat, preferably in shredded form or the form of fine particles. Animal tissue in this form when immersed in cotton-seed oil that is sufficiently heated will quickly cook brown in the hot oil and the odor and flavor of such tissue will be imparted to the oil and will have the same effect as the so-called "crackling". It will therefore be understood that the animal matter that has herein been termed "tissue" or "animal tissue", and also the animal matter that has been termed "crackling" or "animal crackling", are to be regarded as equivalents so far as the present invention is concerned.

What has been said herein with special reference to improving cotton-seed oil is applicable to any vegetable oil which ordinarily develops an objectionable odor when heated. One oil of this character that may be mentioned is olive oil.

The improved cotton-seed oil may be used as an ingredient of any food product or food compound, and when either the improved oil alone, or the food compound comprising the improved oil are heated the odor of cotton-seed oil will not be perceptible, or at least will be so modified as to be free of objection.

Having thus described my invention what I claim and desire to secure by Letters Patent is,—

1. An article of manufacture comprising a vegetable oil imbued with the essence of heated animal tissue.

2. An article of manufacture comprising cotton-seed oil having an odor of heated animal tissue.

3. An improved oil comprising cotton-seed oil imbued with the essence and odor of animal crackling.

4. An article of manufacture comprising a vegetable oil and the essence of heated animal tissue combined so that the odor of the latter will predominate when the article is subjected to heat.

In testimony whereof I affix my signature in presence of two witnesses.

JOHN H. FILBERT.

Witnesses:
G. FERDINAND VOGT,
CHAS. B. MANN.